(12) United States Patent
Yao et al.

(10) Patent No.: US 7,826,640 B1
(45) Date of Patent: *Nov. 2, 2010

(54) HIERARCHICAL STATIC SHADOW DETECTION METHOD

(75) Inventors: Jian Yao, Binghamton, NY (US); ZhongFei (Mark) Zhang, Vestal, NY (US)

(73) Assignee: State University New York, Binghamton, NY (US)

( * ) Notice: Subject to any disclaimer, the term of this patent is extended or adjusted under 35 U.S.C. 154(b) by 361 days.

This patent is subject to a terminal disclaimer.

(21) Appl. No.: 12/111,566

(22) Filed: Apr. 29, 2008

Related U.S. Application Data

(63) Continuation of application No. 10/782,230, filed on Feb. 19, 2004, now Pat. No. 7,366,323.

(51) Int. Cl.
  *G06K 9/00* (2006.01)
  *H04N 7/18* (2006.01)
(52) U.S. Cl. .................. 382/103; 382/274; 348/94
(58) Field of Classification Search .......... 382/103, 382/106, 107, 149, 162, 168, 181, 189, 203, 382/232, 255, 260, 274, 275, 276, 286, 291, 382/312, 305, 118, 311, 170, 294; 356/601, 356/621; 375/240, 240.08; 348/94; 725/10
See application file for complete search history.

(56) References Cited

U.S. PATENT DOCUMENTS

| | | | | |
|---|---|---|---|---|
| 6,349,113 B1 * | 2/2002 | Mech et al. | ........... | 375/240.08 |
| 7,139,409 B2 * | 11/2006 | Paragios et al. | ............. | 382/103 |
| 7,308,156 B2 * | 12/2007 | Steinberg et al. | ............ | 382/294 |
| 7,433,494 B2 * | 10/2008 | Niwa | ........................... | 382/103 |
| 7,496,228 B2 * | 2/2009 | Landwehr et al. | ........... | 382/170 |
| 7,593,603 B1 * | 9/2009 | Wilensky | .................... | 382/311 |
| 7,602,949 B2 * | 10/2009 | Simon et al. | ................ | 382/118 |

OTHER PUBLICATIONS

Christopher Jaynes, Stephen Webb, R. Matt Steele, Michael Brown, and W. Brent Seales, "Dynamic shadow removal from front projection displays", Visualization, 2001. VIS '01. Proceedings, pp. 175-182, 2001.*

Salvador, et al., "Shadow identification and classification using invariant color models", IEEE International Conference on Acoustics, Speech and Signal Processing, vol. 3, 2001, pp. 1545-1548.

(Continued)

*Primary Examiner*—Seyed Azarian
(74) *Attorney, Agent, or Firm*—Ostrolenk Faber LLP; Steven M. Hoffberg

(57) ABSTRACT

There is provided a hierarchical shadow detection system for color aerial images. The system performs well with highly complex images as well as images having different brightness and illumination conditions. The system consists of two hierarchical levels of processing. The first level involves, pixel level classification, through modeling the image as a reliable lattice and then maximizing the lattice reliability using the EM algorithm. Next, region level verification, through further exploiting the domain knowledge is performed. Further analyses show that the MRF model based segmentation is a special case of the pixel level classification model. A quantitative comparison of the system and a state-of-the-art shadow detection algorithm clearly indicates that the new system is highly effective in detecting shadow regions in an image under different illumination and brightness conditions.

24 Claims, 3 Drawing Sheets

OTHER PUBLICATIONS

Scanlon, et al., "A shadow detection and removal algorithm for 2-D images", IEEE Acoustic Speech Signal Processing, 1990, pp. 2057-2060.

Jaynes, et al., "Dynamic Shadow Removal from Front Projection Displays",, Visualization, 2001. VIS '01 Proceedings, pp. 175-182, 2001.

Jiang, et al., "Shadow Identification", International Conference on CVPR, 1992, pp. 606-612.

Finlayson, et al., "Removing Shadows from Images", ECCV 2002, pp. 823-836, 2002.

Weiss, "Deriving intrinsic images from image sequences", ICCV, pp. 68-75, (2002).

Funka-Lea, et al., "Combining color and geometry for the active,visual recognition of shadows", ICCV 1995, pp. 203-209.

Gevers, et al., "Color-based object recognition", Pattern Recognition 32 (1999) pp. 453-464.

Stauder, et al., "Detection of moving cast shadows for object segmentation", IEEE Transactions on Multimedia, vol. 1, No. 1, Mar. 1999.

Mikic, et al., "Moving shadow and object detection in traffic scenes", (2000).

Bouman, "Markov random fields and stochastic image models", 1995 IEEE International Conference on Image Processing.

Finlayson, et al., "Illuminant and gamma comprehensive normalisation in log RGB space", Pattern Recognition Letters 24 (2003) 1679-1690.

Salvador et al., "Shadow Identification and Classification Using Invariant Color Models", IEEE International Conference on Acoustics, Speech and Signal Processing, vol. 3, 2001, pp. 1545-1548.

Joseph M. Scanlan, Douglas M. Chabries, and Richard W. Christiansen, "A Shadow detection and removal algorithm for 2-D images", IEEE Acoustic Speech Signal processing, 1990, pp. 2057-2060.

Christopher Jaynes, Stephen Webb, R. Matt Steele, Michael Brown, and W. Brent Seales, "Dynamic shadow removal from front projection displays", Visualization, 2001. VIS '01. Proceedings, pp. 175-182, 2001.

Caixia Jiang and Matthew O. Ward, "Shadow Identification", International Conference on CVPR, 1992, pp. 606-612.

Graham D. Finlayson, Steven D. Hordley, and Mark S. Drew, "Removing shadows from images", ECCV 2002, pp. 823-836, 2002.

Y. Weiss, "Deriving Intrinsic Images From Image Sequences", ICCV 2001, pp. 68-75.

Gureth Funka-lea and Ruzena Bajcsy, "Combining Color and Geometry for the Active, Visual Recognition of Shadows", ICCV 1995, pp. 203-209.

Graham Finlayson and Ruixia Xu, "Illuminant and Gamma Comprehensive Normalization in logRGB Space", Pattern Recognition Letter, 24 (2003), pp. 1679-1690.

Charles A. Bouman, "Markov Random Fields and Stochastic Image Models", Tutorial presented at ICIP 1995.

I. Mikic, P. Cosman, G. Kogut, and M. M. Trivedi, "Moving shadow and object detection in traffic scenes", Proceedings of Int'l Conference on Pattern Recognition, Sep. 2000, pp. 321-324.

Jurgen Stauder, Roland Mech, and Jorn Osterman, "Detection of moving cast shadows for object segmentation", IEEE Trans. on Multimedia, vol. 1, No. 1, 1999, pp. 65-76.

T. Gevers, A. W. M. Smeulders, "Color-based object recognition", Pattern Recognition, vol. 32, 1999, pp. 453-464.

\* cited by examiner

HIERARCHICAL STATIC SHADOW DETECTION METHOD

FIELD OF THE INVENTION

The invention pertains to detection of shadows in an image and, more particularly, to the detection of shadows in single, static images.

BACKGROUND OF THE INVENTION

Robust shadow detection is considered a difficult problem in computer vision and other areas requiring image interpretation. Shadows may be classified depending upon whether the shadow is moving. Consequently, methods have been developed for detecting both static and moving shadows. Moving shadow detection methods are useful for videos or image sequences while static shadow detection methods are applicable to single images. Andrea Prati, Rita Cucchiara, Ivana Mikic, Mohan M. Trivedi, "Analysis and detection of shadows in video streams: a comparative evaluation", CVPR 2001, provide an overview of prior art moving shadow detection methods.

U.S. Pat. No. 6,349,113 for METHOD FOR DETECTING MOVING CAST SHADOWS OBJECT SEGMENTATION, issued Feb. 19, 2002 to Roland Mech et al. teach one method for identifying moving shadow regions occurring in a series of images. In the MECH et al. method, both the background and the camera are assumed to be in a fixed position relative to the images being analyzed. The MECH et al. method utilizes an analysis method known as moving cues wherein pixels from two consecutive frames are compared. This is a temporal method and finds no applicability in identifying shadow regions in single, static images.

The present invention, however, pertains only to methods for static shadow detection within a single image. While moving shadow detection may take advantage of in-motion sequences where the motion cues may be exploited to help detect shadow regions in each frame, robust shadow detection in static imagery is more challenging. Compared with moving shadow detection, there are relatively few methods reported in the literature on static shadow detection. These include Elena Salvador, Andrea Cavallaro, Touradj Ebrahimi, "Shadow identification and classification using invariant color models", IEEE International Conference on Acoustics, Speech and Signal Processing, Vol. 3, 2001, pp. 1545-1548 (SALVADOR et al.) where an invariant color model is used to develop a shadow detection system.

Joseph M. Scanlan, Douglas M. Chabries, and Richard W. Christiansen, "A Shadow detection and removal algorithm for 2-D images", IEEE Acoustic Speech Signal processing, 1990, pp. 2057-2060 discloses the use of a mean image to detect and remove a shadow.

Christopher Jaynes, Stephen Webb, R. Matt Steele, Michael Brown, and W. Brent Seales, "Dynamic shadow removal from front projection displays", Visualization, 2001. VIS '01. Proceedings, pp. 175-182, 2001 address the shadow detection problem for multiview input images, but a predicted image is required for each view.

Caixia Jiang and Matthew O. Ward, "Shadow Identification", International Conference on CVPR, 1992, pp. 606-612 teach an adaptive threshold to generate dark regions followed by vertices detection to verify shadow regions.

Graham D. Finlayson, Steven D. Hordley, and Mark S. Drew, "Removing shadows from images", ECCV 2002, pp. 823-836, 2002 address the illumination invariant shadow removal problem, where a sequence of images of a fixed scene is required to generate a camera calibration.

Y. Weiss, "Deriving Intrinsic Images From Image Sequences", ICCV 2001, pp. 68-75 successfully separates images into reflectance images (shadow free images) and illumination images under the assumption that those images contained same reflectance intrinsic image (i.e., they are taken from same scene), but different illumination intrinsic images (i.e., they were taken at a different time).

Gureth Funka-lea and Ruzena Bajcsy, "Combining Color and Geometry for the Active, Visual Recognition of Shadows", ICCV 1995, pp. 203-209 (FUNKA-LEA et al.) combine color and geometry to detect shadows cast by non-point light sources.

Each of these existing methods suffers from one or more of the following problems:

1) These prior art methods are heavily dependent on brightness and illumination conditions. Most algorithms have parameters that fit only particular illumination conditions. If these algorithms are left unchanged and applied to images with different illumination conditions, the shadow detection performance is generally unacceptable.

2) These prior art methods use color information in a rather ad hoc manner. Most assume that the shadows are dark.

3) Often these shadow detection methods of the prior art fail to combine geometric information leads. This failure often results in unsatisfactory shadow detection performance when analyzing real, complex images. It is recognized that each shadow object has a geometric connection with the object generating it. Pixel level classification schemes do not take advantage of this geometric connection sufficiently, if at all.

4) Most prior art detection methods make at least some assumptions based on prior knowledge of scene geometry.

On the other hand, the method of the present invention overcomes these and other shortcomings of these known prior art methods. The inventive method makes no assumptions other than single color images that have only a single point light source (e.g., the sun) are being analyzed. To overcome the first problem of prior art methods, the inventive method adds a pre-processing step to change a red/green/blue (RGB) color space into a normalized LogRGB space, which is brightness and illumination invariant. Such a process is suggested by Graham Finlayson and Ruixia Xu, "Illuminant and Gamma Comprehensive Normalization in logRGB Space", Pattern Recognition Letter, 24 (2003), pp. 1679-1690.

To overcome the above-identified second and third problems, the inventive method provides a two-level shadow detection algorithm. At the pixel level, the image is modeled as a reliable lattice (RL). The lattice reliability is defined by both node reliabilities and link reliabilities. The inventors have determined that shadow detection can be achieved by finding the RL having the maximum lattice reliability. At the region level, application oriented procedures which remove most possible false detected regions are applied. Since shadow detection can be considered as a special case of image segmentation, the relationship between the RL model and an MRF model such as that taught by Charles A. Bouman, "Markov Random Fields and Stochastic Image Models", Tutorial presented at ICIP 1995 is also developed. MRF models are know to be one of the most popular models for image segmentation. For this reason, there use in shadow detection is important and also allows for possibility of extending the methods of the present invention into more general image segmentation areas. The relationships between RLs and MRFs are developed hereinbelow.

SUMMARY OF THE INVENTION

In accordance with the present invention there is provided a hierarchical shadow detection method for color aerial images. The inventive system meets two challenges for static shadow detection existing in the prior art. First, images having different brightness and illumination conditions are easily handled by the inventive algorithm. Second, highly complex images may also be handled.

The algorithm consists of two hierarchical levels of processing. First, the pixel level classification is performed by modeling the image as a reliable lattice and then maximizing the lattice reliability by using an Expectation Maximization (EM) algorithm. Next, region level verification is performed by further exploiting the domain knowledge. For example candidate region properties, such as shape, are typically well known. For example, when the whole shape of a candidate region is examined and found to be rectangular, this information may be used to make decisions regarding whether a candidate region is a shadow region. Particular candidate regions known to be frequently falsely detected shadow regions so that such regions may be removed as shadow candidates.

Further analyses show that the MRF model based segmentation is a special case of the pixel level classification model. A quantitative comparison between this method and state-of-the-art shadow detection algorithms clearly indicates that the MRF-based pixel classification method shows promise in delivering effective and robust shadow detection under different illumination and brightness conditions.

It is therefore an object of the invention to provide an system for effectively identifying shadow regions in static images.

It is another object of the invention to provide a hierarchical method for effectively identifying shadow regions in static images.

It is a further object of the invention to provide a hierarchical method operating in a pixel classification level and in a region level verification mode.

It is an additional object of the invention to provide a hierarchical system wherein an original image is modeled into a reliable lattice (RL).

It is a still further object of the invention to provide a hierarchical system wherein a reliable lattice is iteratively processed.

It is another object of the invention to provide a hierarchical method wherein the reliability of the reliable lattice is maximized.

It is a further object of the invention to provide a hierarchical system wherein falsely detected shadow regions are identified and removed from consideration.

BRIEF DESCRIPTION OF THE DRAWINGS

A complete understanding of the present invention may be obtained by reference to the accompanying drawings, when considered in conjunction with the detailed description, in which:

FIG. 1b is the shadow detection result of the method of the invention for the image of FIG. 1a;

FIG. 1c is the shadow detection result of the prior art invariant color model algorithm described by Elena Salvador et al. for the image of FIG. 1a;

DESCRIPTION OF THE PREFERRED EMBODIMENT

Figure 1A:
FIG. 1a is a first original image.

The present invention provides a method of detecting shadow regions in static images. Specifically, the inventive method provides a system for automatically detecting time-specific objects in overhead imagery databases (i.e., aerial images). Examples of time-specific objects include shadows, vehicles on a road, airplanes on a runway, people walking on the ground, etc. The method of the present invention is particularly suitable for applications such as aerial surveillance, battlefield planning, and simulation based pilot training. After the detection and removal of the time-specific objects in the imagery, the present invention can generate static scene-based overhead imagery databases where photo-realistic and simulation-based manipulations may be conducted for different applications.

Shadows occur when objects totally or partially occlude direct light projected from a source of illumination. There are two types of shadows: cast shadows and self (attached) shadows. A cast shadow is the projection of an object onto other objects, such as the ground. A self shadow is a portion of the object itself in an image that is not illuminated by light sources. The present invention deals primarily with detecting cast shadows.

First a shadow detection model is described which addresses the topics: how to generate an initial reliable lattice (RL), how to iteratively update the RL to achieve maximum lattice reliability, how to improve the RL model, how to determine the relationship between the RL model and a Markov Random Field (MRF) model, and how to perform region level verification.

Once an input image is provided, that input image is mapped to a lattice having the same dimensions as the input image. Each pixel in an image may be mapped to a node in a corresponding lattice. To include locality in the RL model, two nodes are defined as having a link only when their corresponding adjacent pixels are neighbors. Each node in the lattice has observed data (color information of the corresponding pixel), a shadow value (shadow probability of the corresponding pixel), and a node reliability. Each link in the lattice also has a link reliability. The lattice reliability is defined from both the node reliabilities and the link reliabilities. All of the reliabilities are discussed in detail hereinbelow.

Shadow detection is related to finding the RL with the maximum lattice reliability. In the inventive method, a simple method is used to generate an initial RL. An iterative procedure is then used to update the RL in order to maximize the lattice reliability.

It is assumed that the original image and its corresponding lattice are defined on a rectangular grid, S, with size N. To simplify notation, a one dimensional vector is used to represent a two dimensional image. The value (i.e., the observed data) at a pixel (node) $S_i$, i=1, . . . , N, is represented as $Y_i$, which is a random variable. Each node $S_i$ also has unobserved data (i.e., the shadow value) $X_i$, which is also a random variable with a value between 0 and 1. $X_i$ serves as an index of the shadow probability, with the higher value representing higher shadow probability. The traditional definition of the neighborhood system is used. Assume $\partial(S_i)$ is the neighbor set of $S_i$, the collection $\{\partial(S_i), i=1, \ldots, N\}$ is the neighborhood system on S if $S_i \notin \partial(S_i)$ and $S_i \in \partial(S_j)$ if and only if $S_j \in \partial(S_i)$.

A clique of a neighborhood system is a set of points that are all neighbors of each other. The neighbor number of a node is denoted as D. In the inventive method, an 8-point neighborhood system is used, thus D is 8. Uppercase letters are used to represent random vectors or variables and lowercase letters are used to represent particular values taken by random vectors or variables. Superscript letters represent the same value at different iterations while subscript letters represent the corresponding components of a vector.

Initial RL Generation

Shadow detection is a special case of image segmentation, where the image is segmented into shadow regions and non-shadow regions. A general image segmentation algorithm typically uses two region level properties: infra-region similarity and inter-region contradiction. It is desirable that any shadow detection system use, at the pixel level, some shadow pixel's properties. Typically, shadow pixels tend to have lower luminance (L) and tend to be bluish, as reported by I. Mikic, P. Cosman, G. Kogut, and M. M. Trivedi, "Moving shadow and object detection in traffic scenes", Proceedings of Int'l Conference on Pattern Recognition, September, 2000, pp. 321-324, and by Jurgen Stauder, Roland Mech, and Jorn Osterman, "Detection of moving cast shadows for object segmentation", IEEE TRANS. On Multimedia, Vol. 1, No. 1, 1999, pp. 65-76. It is these properties that distinguish shadow pixels from non-shadow pixels. In the initialization stage, only pixel level shadow properties are used.

To fully utilize the pixel level properties, luminance L and $C_3$ (i.e., color feature as defined in Equation 1) are combined. The result is denoted C as proposed in T. Gevers, A. W. M. Smeulders, "Color-based object recognition", Pattern Recognition, Vol. 32, 1999, pp. 453-464.

$$C_3 = \arctan\left(\frac{B}{\max(R, G)}\right) \quad (1)$$

Instead of using a two dimension vector, a quantization procedure may be applied to the (L, C) vectors to form discrete values. Despite possible loss of information, there are three reasons why this quantization may be desirable. First, this process enhances the robustness. Because of noise and small illumination variance, shadow pixels typically exhibit differences in (L, C) values; by applying quantization, the (L, C) values of these pixels are mapped to the same or similar values. Second, by using an integer to represent a pair (i.e., double, double), this process also saves memory and computation time. Third, the shadow distribution function is used and it is very hard to determine the correct density function if it is defined on original real continuous L and C values. If the quantization process is correctly applied, the quantized histogram may be used to accurately simulate shadow mass distribution without any other prior information.

During the training stage, the shadow probability of a pixel $S_i$ with observed data $y_i$ is computed:

$$P(S_i) = P(Y_i = y_i) = \frac{SH(y_i)}{SH(y_i) + NSH(y_i)} \quad (2)$$

where SH stands for a shadow histogram; and NSH stands for a non-shadow histogram. SH(i)(NSH(i)) denotes the shadow (non-shadow) pixel number with quantized data i.

The prior shadow distribution, which is the conditional distribution of shadow given the quantitized data, is denoted $\{P(Y_s=y_s)\}$.

In the detection stage, pre-computed prior shadow probability is loaded and shadow value at each node is computed by:

$$X_i = P(Y_i = y_i) \quad (3)$$

To make both the inventive system brightness change and illumination change invariant, before computing the L and C values, the algorithm provided by Finlayson and Xu is used to normalize RGB values. By doing this, only one set of prior shadow distribution is sufficient for different illumination conditions. The experimental data provided hereinbelow verifies this assumption.

RL Updating

A node reliability function f is defined based on $X_i$ and $Y_i$:

$$ren(S_i) = f(X_i, Y_i, s) = e^{(-(X_i - s(Y_i))^2)} \quad (4)$$

where s(a) (where "a" corresponds, for example to $Y_i$ which is a random variable) is a random variable that stands for the shadow value of a pixel with observed data a. Node reliability is considered as the matching probability of a pixel's estimated shadow value ($X_i$) with its observed data ($Y_i$). The closer the difference between the estimated shadow value at a node and the shadow probability of observed data, the more reliable is the node. It may readily be observed that the initial RL is the best when total node reliabilities are maximized. The question arises whether the node reliability is sufficient to represent the graph reliability. Considering the two-level properties mentioned above, it has been found that node reliability is only dependent on the histogram. In other words, when pixels of an image are arbitrarily reordered, the histogram retains the same total node reliabilities. Thus, spatial information does not significantly contribute to node reliability. Another link reliability function g on each link (assuming the link connects to node $S_i$ and $S_j$) is introduced:

$$rel(S_i, S_j) = g(X_i, Y_i, X_j, Y_j, dif) = e^{(-(X_i - X_j - dif(Y_i, Y_j))^2)} \quad (5)$$

where dif(a,b) (where "a" and "b" correspond to random variables such as $x_i$ and $y_i$) is a random value, standing for the difference of shadow values between two connected nodes with observed data a and b. It may be observed that dif(a,b) is not symmetric, and that the expectation value of dif(a,b) is an exact negative of the expectation value of dif(a,b).

The link reliability is defined as the probability that two pixels may become neighbors. It may also be observed that there are two ways to achieve high link reliability. Similar neighbors with similar shadows values, corresponding to intra-region neighbors which tend to be shadow or non-shadow simultaneously, create high link reliabilities. Also, dissimilar neighboring pixels with dissimilar shadow values (i.e., inter-region neighbors), have less possibility of being either a shadow or a non-shadow adjacent one another. This situation also creates high link reliabilities.

Assuming the independence of the node reliabilities and the link reliabilities, and also assuming that different nodes' reliabilities and different links' reliabilities both have identical independent distributions (IIDs), the lattice reliability may be denoted as:

$$reg(S) = \prod_{i=1...N} ren(S_i) \prod_{i=1...N} \prod_{j \in \partial S_i} rel(S_i, S_j) \quad (6)$$

From equation (6), it may be observed that a lattice has high graph reliability if and only if it has both high node reliabilities and link reliabilities. High node reliabilities are equivalent to high correctly detected shadow pixel numbers, while high link reliabilities are equivalent to perverse intra-region homogeneity and inter-region contradiction. Combining these factors, it may be concluded that high graph reliability corresponds to high shadow detection performance.

Taking the logarithm on both sides of equation (6) and substituting the results of equations (4) and (5) into equation (6) results in:

$$\text{Ln}(reg(S)) = \sum_i \text{Ln}(f(X_i, Y_i, s)) + \sum_i \sum_{j \in \partial S_i} \text{Ln}(g(X_i, X_j, Y_i, Y_j, dif)) \quad (7)$$

Since s(a) and dif(a, b) are both random values, the EM algorithm (i.e., A. P. Dempster et al. [3]) may be used to maximize Ln(reg(S)) by considering Y as the incomplete data.

Assuming that s(a) is quantized into G values $(T_1, \ldots, T_G)$ and that dif(a,b) is quantitized into H values $(W_1, \ldots, W_H)$, two unknown parameter sets may be introduced:

$$U_{lm} = P(X_i = T_m | Y_i = l) \quad (8)$$

$$V_{lmk} = P(dif(l,m) = W_k | Y_i = l, Y_j = m) \quad (9)$$

When $$\sum_m U_{lm} = 1$$

for every l and $$\sum_k V_{lmk} = 1$$

for every (l, m).

Then the E step of the EM algorithm is of the form:

$$Q(X|X^n) = E_{U,V}\{\text{Ln}(reg(S)|X^n, Y)\} \quad (10)$$

and the M step is given by:

$$\text{Max}_X Q(X|X^n) \quad (11)$$

By simple replacement, equation (10) becomes:

$$Q(X|X^n) = \quad (12)$$
$$-\sum_{i=1}^N \sum_{l=1}^G (X_i - T_l)^2 U_{Y_i l} - \sum_{i=1}^N \sum_{j \in \partial S_i} \sum_{l=1}^H (X_i - X_j - W_l)^2 V_{Y_i Y_j l}$$

which leads to the following iterative steps:

$$U_{lm}^{new} = \frac{|\{i, Y_i = l, X_i = T_m\}|}{|\{i, Y_i = l\}|} \quad (13)$$

$$V_{lmk}^{new} = \frac{|\{(i, j), Y_i = l, Y_j = m, dif(l, m) = W_k\}|}{|\{(i, j), Y_i = l, Y_j = m\}|} \quad (14)$$

$$X_i^{new} = \left(2 \sum_{j \in \partial S_i} X_j + \sum_{m=1}^G U_{Y_i m}^{new} T_m + \sum_{j \in \partial S_i} \sum_{k=1}^H W_k V_{Y_i Y_j k}^{new} - \sum_{j \in \partial S_i} \sum_{k=1}^H W_k V_{Y_j Y_i k}^{new} \right) / (2D+1) \quad (15)$$

Two stopping criteria are set for the these iterative procedures: the procedures will stop when either the iteration number reaches a pre-defined maximum iteration number or the relative MSE is acceptable:

$$RMSE = \frac{1}{N} \sum_i \left(\frac{X_i^{new} - X_i^{old}}{X_i^{old}}\right)^2 < 0.5\% \quad (16)$$

where 0.5 is an empirical number, which is insensitive to different images.

Improvement of the System

In the previous RL updating procedure, each pixel's shadow value is assumed to be influenced only by its neighbors. Such influence has undesirable side effect. For example, there is a high probability that certain shadow pixels will change their status to non-shadow pixels because of the influence of their not-so-certain non-shadow neighbors. The concepts of committed pixels and uncommitted pixels are now introduced to restrict such influence. A similar idea was proposed by Chou and Brown. A committed pixel is a pixel which is definitely either a shadow pixel or a non-shadow pixel. Committed pixels should not be influenced by its neighbors (i.e., its shadow value should never be changed). From equation (2), it is known that shadow value 0(1) corresponds to certain non-shadow(shadow) pixels and that the higher the absolute difference of a pixel's shadow value from 0.5, the more certain is the status of the pixel. The definition of a committed pixel is:

$$|X_i - 0.5| > 0.45 \quad (17)$$

where 0.45 is an empirical number, which is insensitive to image differences.

Initially, all the pixels of an image are uncommitted pixels. The ultimate goal of the image processing leading to shadow detection is to make all of the pixels committed pixels. Consequently, the inventive system is considered as a pixel status movement procedure (i.e., from uncommitted status to committed status). At the end of each iteration, the status of those uncommitted pixels is changed if they satisfy equation (17). When the EM stops, if some pixels still have an uncommitted status, these pixels may be assigned to either the shadow pixel or non-shadow pixel sets by checking whether their shadow values are above or below 0.5, respectively.

Another issue concerns $U_{lm}$, when different pixels with the same Y values have the same X distributions are considered.

While this happens infrequently, such distributions should be local instead of global. In order to combine such locality, the image is divided into B×B blocks and so that the $U_{lm}$ set for all the pixels in one block is the same. If $B_i$ denotes the block index for pixel $S_i$, then equation 12 becomes:

$$Q(X \mid X^n) = \tag{18}$$

$$-\sum_{i=1}^{N}\sum_{l=1}^{G}(X_i - T_l)^2 U_{Y_i B_i l} - \sum_{i=1}^{N}\sum_{j \in \partial S_i}\sum_{l=1}^{H}(X_i - X_j - W_l)^2 V_{Y_i Y_j l}$$

If C denotes a committed pixel set and UC denotes an uncommitted pixel set, then equation 15 becomes:

$$\begin{cases} X_i^{new} = X_i^{old}, S_i \in C \\ X_i^{new} = \dfrac{1}{2D+1}\left(2\sum_{j \in \partial S_i} X_j^{old} + \sum_{m=1}^{G} U_{Y_i B_i m} T_m + \right. \\ \left. \sum_{j \in \partial S_i}\sum_{k=1}^{H} W_k V_{Y_i Y_j k} - \sum_{j \in \partial S_i}\sum_{k=1}^{H} W_k V_{Y_j Y_i k}\right), S_i \in UC \end{cases} \tag{19}$$

Relationship to MRF-Based Segmentation

Typical MRF-based segmentation algorithms are realized by maximizing a posterior probability:

$$\underset{x}{\text{Max}} P(X = x \mid Y) \propto \underset{x}{\text{Max}} p(Y = y \mid X) P(X = x) \tag{20}$$

where p(Y=y|X) is factorized into each pixel and P(X=x) is realized by a MRF:

$$p(Y = y \mid X) = \prod_i p(Y_i = y_i \mid X_i) \tag{21}$$

$$P(X = x) = \frac{1}{Z} e^{\{-\sum_{c \in C} V_c(x_c)\}} \tag{22}$$

The assumption for equation (21) is that $p(Y_i=y_i|X_i)$ at each pixel is an i.i.d. The Z in equation (22) is a partition function, which is a normalizing constant. C is the set of all cliques and $V_c$ is known as potential function. Several MRF-based segmentation algorithms differs only their $V_c$ values. By substituting equations (21) and (22) into equation (20), it may be observed that:

$$\underset{x}{\text{Max}} \ln(P(X = x \mid Y)) \propto \underset{x}{\text{Max}}(\text{Ln}(p(Y = y \mid X)) + \ln(P(X = x))) = \tag{23}$$

$$\underset{x}{\text{Max}}\left(\sum_i p(Y_i = y_i \mid X_i) - \sum_{c \in C} V_c(X_c)\right)$$

If only two-point cliques are allowed, p and $V_c$ may be written as:

$$P(Y_i = y_i \mid X_i = x_i) = f(Y_i, X_i) \tag{24}$$

$$V_c(X_c) = -g(X_i, X_j, Y_i, Y_j) \tag{25}$$

this yields:

$$\underset{x}{\text{Max}} \text{Ln}(P(X = x \mid Y)) \propto \tag{26}$$

-continued $$\underset{x}{\text{Max}}\left(\sum_i f(X_i, Y_i) + \sum_i \sum_{j \in \partial S_i} g(X_i, X_j, Y_i, Y_j)\right)$$

This is almost the same as equation (7), except that in the inventive algorithm, functions f and g are also dependant on the random variables s and dif. Typically, it is hard to anticipate such f and g functions in the MRF model. What is done in this case is to let the system learn the f and g functions through s and dif instead of predefining them. Since in the inventive system, not only is prior common information included but also image dependent information is combined, the algorithm is more reliable and more robust than those of the prior art. Of course, when s and dif are set constant (i.e., pre-defined and constant), the inventive RL model becomes identical to an MRF model. Therefore, the MRF model may be considered as a special case of the inventive RL model by setting the two random variable sets as constant over multiple iterations.

Region Level Verification

Since there is no geometry information used in pixel level classifications, the detection results at the pixel level classification are incomplete (FUNKA-LEA et al.) If a relatively large region is falsely classified as a shadow region, the tendency is for pixels in the region tend to make their neighbor pixels become shadow pixels instead of making the falsely classified pixels become non-shadow pixels. A similar idea about segmentation is discussed in Charles A. Bouman, "Markov Random Fields and Stochastic Image Models", Tutorial presented at ICIP 1995.

Refer now to FIG. 1a where this phenomena may be observed. The dark regions in the left building were detected as shadows when only the pixel level classification was performed. The is not only because the pixels of those area have similar color features to those of real shadow pixels, but also because the windows regions are quite homogeneous and their contradictions to neighbor regions are remarkable. This problem is mainly caused by lack of high level information, for example, is such a shadow region possible with such neighbor regions? There is also another shortcoming for pixel level classification. Usually, the resulting images look rougher (i.e., not as smooth) as they should. This second problem is mainly caused by noise. These two problems cannot be solved without region level processing. Solving the second problem is relatively easy. Morphological operations may be applied to make the shadow images smooth and to remove the effects of the noise. A connected component algorithm is applied to the shadow images to form shadow regions. Very small shadow regions (e.g., areas less than 5 pixels) are removed from shadow region list. After all these steps are complete, the candidate shadow region list is built.

On the one hand, shadows can be confidently recognized only once the scene geometry, materials, and a characterization of the flux of light throughout the scene are known (FUNKA-LEA et al.) On the other hand, shadow detection is not a final goal, but rather is used to retrieve the object information of the scene, which includes geometry information. Consequently, completely solving the first problem is impossible in the inventive application. However, a simple procedure to remove the maximum number of false detected shadow regions in application has been incorporated in the inventive method. By analyzing the outer boundaries of real shadow regions, the inventors have found that these boundaries are quite inhomogeneous. The reason for this is fairly simple. Each shadow region is always connected to the object that the shadow comes from as well as the object onto which the shadow is cast. The boundary between the shadow and the objects generally does not have the same color features as those of the boundary between the shadow and the cast-to object. For the falsely detected windows previously discussed, outer boundaries are generally quite homogeneous since they come from the same object (e.g., wall, etc.). Because the intended application of the method of the present invention is processing overhead aerial images, most of falsely detected shadow regions are typically doors, windows, and objects at self shadow regions, and generally have regular shapes, typically rectangular. Such objects have the following properties: first, their boundary differences tend to be homogenous; and second, their boundaries tend to be regular, mostly rectangular.

To remove objects having such properties, the following application oriented procedures have been found useful. A rectangular test is first applied to each candidate shadow region. For those regions which have positive test results, variance tests are then applied. The luminance variance of the outer boundary may be used to represent the boundary's homogeneity. True shadow regions generally have higher variances while false shadow regions typically have smaller variances. Assuming that the mass condition functions for variance (the variance has been quantized into discrete values) of shadow region and non-shadow region are $P(\sigma|SR)$ and $P(\sigma|NSR)$, respectively. From Bayes decision theory, it is known that to find an optimal separation variance SV equal to the minimized the Bayes error:

$$P(\text{error}) = P(S, \sigma > SV) + P(NS, \sigma < SV) = \sum_{\sigma=SV}^{MAX\sigma} P(\sigma \mid SR) + \sum_{\sigma=MIN\sigma}^{SV} P(\sigma \mid NSR). \quad (27)$$

Based on training regions, the histogram may be used to simulate $P(\sigma|SR)$ and $P(\sigma|NSR)$. By minimizing $P(\text{error})$ over SV, the optimal separation variance SV may be found. This optimal separation variance may then be applied to each shadow region in classification stage to build final shadow map (i.e., the shadow image at the region level). A typical SV is in the range of approximately 4.8.

Experiments

Several experiments have been conducted to evaluate and compare the inventive system with a state-of-the-art algorithm given in SALVADOR et al. The experiments were conducted under several different situations: similar scenes with similar illumination and brightness conditions; similar scenes with different illumination and brightness conditions; and different scenes. Experimental results show that the inventive method is illumination and brightness independent while somewhat scenery dependent. The experiments were performed on a database of 42 images. These images were manually divided into three sets. Set one contains 19 aerial images with similar brightness and illumination conditions of similar scenes. Set two contains 10 images, which are from scenes similar to the scenes of set one but having different illumination and brightness conditions. Set three contains 13 images, some of which are aerial images while others are not. The scenes are different than those of sets one and two. All the images were ground-truthed by the method described below.

Three images were randomly selected from set one to serve as training images. Selection was based on which prior shadow distribution is generated using the initial RL generation. The entire experiments were repeated several times with different selected training images. Similar results were obtained regardless of the training images selected.

The evaluation method given by Prati et al. which separated the images into shadow, object, and background, was modified to quantitatively evaluate the inventive method and compare it with the algorithm of SALVADOR et al. A similar evaluation method can be found in Shufelt for building detection evaluation. The evaluation metrics are defined on false positive (FP), false negative (FN), true positive (TP), and true negative (TN) by:

Correctness: 100*TP/(TP+FN)

Accuracy: 100*TP/(TP+FP+FN)

The correctness metric is a measure of correctly detected shadow pixels among all shadow pixels. Accuracy reports the total accuracy of the method, which takes both FP and FN into account. For a good shadow detection algorithm, both correctness and accuracy should be high.

Experimental Results

The first experiment was to compare the performance under similar illumination and brightness conditions of the inventive method compared to the method of SALVADOR et al. All images of set one were used as test images. Table 1 shows the evaluation results for both methods.

TABLE 1 comparison between our method and SALVADOR et al. using images of set one.

|  | Correctness | Accuracy |
|---|---|---|
| Invention | 95.426% | 93.316% |
| SALVADOR et al. | 90.337% | 80.693% |

Figure 1B:
Figure 1C:

It may clearly be seen that both the correctness and accuracy metrics show that the inventive method is superior. It may be noted that correctness difference between the inventive method and SALVADOR et al. is smaller than the accuracy difference. This is because in SALVADOR et al., there are many false positive shadow regions. FIG. 1b shows the detection results for the image of FIG. 1a using the inventive method while FIG. 1c shows the detection results using SALVADOR et al. Comparing FIG. 1b with FIG. 1c, it may be noted that most dark self shadows in the left building are detected as shadow in SALVADOR et al. However, a large shadow region at center right area is missed, and a shadow region cast from a building to a building is missed in SALVADOR et al. Careful examination also reveals many minor differences in the two results. In addition, the result of SALVADOR et al. appear to be quite noisy. Unfortunately for both algorithms, some other building shadow cast onto a building is lost and there are still FP shadows detected in the near left building. This is because the texture information in these regions is not similar to most real shadow regions. This example shows how complex a typical aerial overhead image is in terms of shadow detection, and also shows the challenges a robust shadow detection algorithm faces.

The second experiment compares the performance under different illumination and brightness conditions between the inventive method and SALVADOR et al. All the images of set two were used as test images. Table 2 shows the evaluation results for both methods.

TABLE 2 comparison between inventive method and
SALVADOR et al. using images of set two.

|  | Correctness | Accuracy |
| --- | --- | --- |
| Invention | 93.462% | 91.273% |
| SALVADOR et al. | 76.113% | 68.412% |

Comparing the results of Table 2 with those of Table 1, it may readily be seen that that the performance of the inventive method remains substantially the same in both experiments while the results of SALVADOR et al. are poorer in the second experiment. These results further illustrate that the inventive method is both illumination and brightness condition independent.

The third experiment compares the performance under different scenes between the inventive method and the method of SALVADOR et al. All the images of set three were used as test images. Table 3 shows the evaluation results for both methods.

TABLE 3 comparison between inventive method and
SALVADOR et al. using images of set three.

|  | Correctness | Accuracy |
| --- | --- | --- |
| Invention | 89.332% | 83.299% |
| SALVADOR et al. | 76.364% | 53.412% |

Figure 1D:
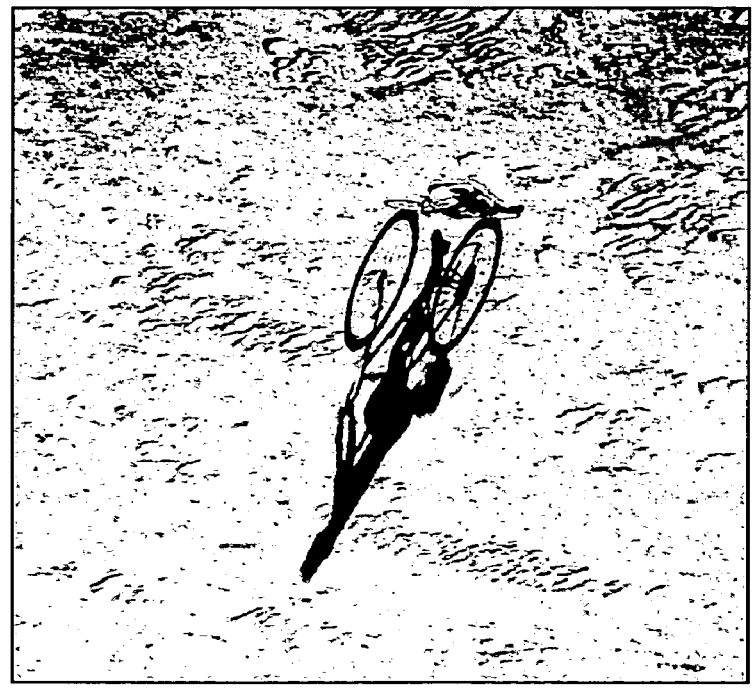
FIG. 1d is a second original image.
Figure 1E:
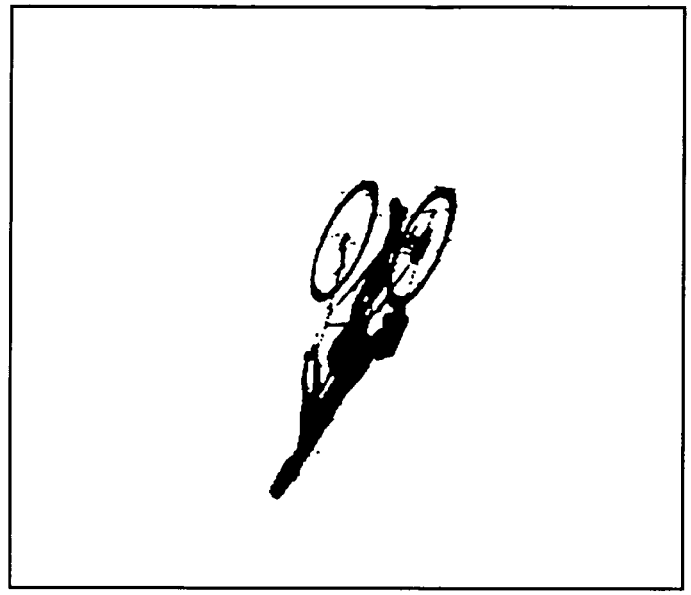
FIG. 1e is the shadow detection result of the method of the invention for the image of FIG. 1d.
Figure 1F:
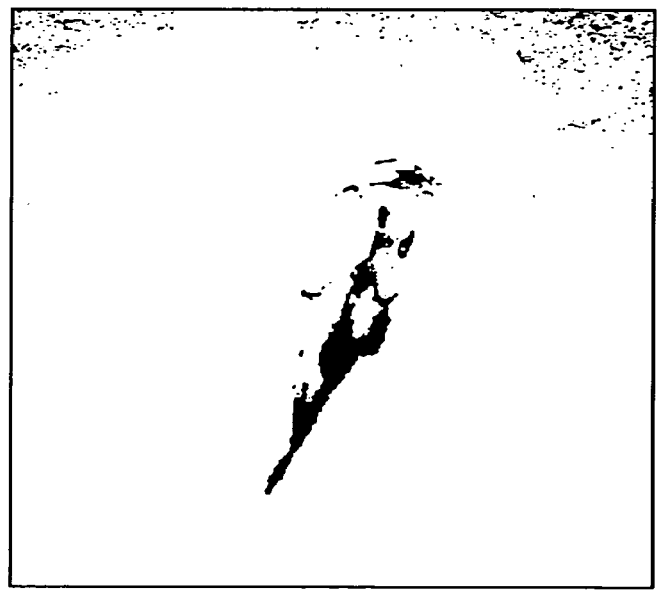
FIG. 1f is the shadow detection result of the prior art invariant color model algorithm described by Elena Salvador et al. for the image of FIG. 1d.

It may be seen that both algorithms experience worse performance when compared to experiment one and two. However, the inventive method experiences less degeneration than SALVADOR et al. Moreover, the average accuracy of the inventive method is still deemed generally acceptable. FIGS. 1d-1f show another detection result comparing the inventive method and the SALVADOR et al. algorithm. FIG. 1d is a different original image. It may be seen that the shadow of the bicycle is well preserved in results from the inventive method (FIG. 1e) while there is a large number of noise shadows and lost bicycle shadows in the results of SALVADOR et al. (FIG. 1f).

The final experiment serves to evaluate the functionality of region level verification. As discussed hereinabove, region level verification can remove some falsely detected shadow regions. All of the images were used as test images, but separate percentages are generated for each set. Table 4 shows the results of this evaluation.

TABLE 4 helpful of region level verification

|  | Set 1 | Set 2 | Set 3 |
| --- | --- | --- | --- |
| Falsely removed/totally removed | 2/47 | 0/23 | 6/39 |

It may be seen from Table 4 that for aerial images, the region level verification of the inventive method is very successful. Even for test images which are not aerial images, such verification still appears to be useful.

In summary, while automatic and robust shadow detection in aerial overhead imagery is still considered a challenging problem, the shadow detection algorithm of the present invention solves many of the shortcomings of the prior art methods. The inventive method is substantially independent of illumination and brightness conditions while still achieving very good shadow detection accuracy. The inventive system used pixel level classification and region level verification. In pixel level classification, the image is modeled as an RL. By maximizing the reliability of the RL, shadow detection is realized. Two rules are applied at region level verification to remove some particular falsely detected shadow regions. The relationship between the inventive RL model and an MRF model are also developed. An objective evaluation scheme is applied to the inventive method as well as a state-of-the-art shadow detection algorithm to demonstrate the robustness and accuracy of the inventive method. The objective results verify that the inventive method, while somewhat scene dependent, is largely independent of illumination and brightness conditions.

Since other modifications and changes varied to fit particular operating requirements and environments will be apparent to those skilled in the art, the invention is not considered limited to the examples chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A data processing method comprising the steps of:
receiving a data vector having an associated data domain knowledge;
modeling the received data vector as a reliable lattice by mapping elements of the received data vector onto nodes in a corresponding reliable lattice, each node having a classification and a node classification reliability, and being linked to proximate nodes of the reliable lattice by respective links, each link having a lattice link reliability;
iteratively improving the lattice reliability by using an Expectation Maximization algorithm executing on an automated data processor, to alter node classifications of the elements to generate an optimized reliable lattice;
performing verification of the optimized reliable lattice based on the domain knowledge, to reclassifying nodes of the optimized reliable lattice in dependence on the data domain knowledge and the received data vector; and
producing an output at least in dependence on the optimum reliable lattice and verification.

2. The data processing method according to claim 1, wherein the data vector comprises an image comprising a plurality of pixels, wherein the received data vector is modeled as a reliable lattice by mapping pixels of the image onto nodes in a corresponding lattice.

3. The data processing method according to claim 2, wherein each pixel has an associated color and luminance and a property to be classified, said property being unobserved in the image.

4. The data processing method according to claim 3, wherein the iterative Expectation Maximization algorithm updates a classification of a pixel is based on the associated respective color, luminance, and prior classification of the pixel, and respective color, luminance, and classification of proximate pixels within the image.

5. The data processing method according to claim 1, wherein the iterative Expectation Maximization algorithm improves, for each iteration, a probability of correct classification of each element of the data matrix.

6. The data processing method according to claim 1, wherein the iterative Expectation Maximization algorithm improves, for each iteration, a product of a lattice node reliability and a lattice link reliability.

7. The data processing method according to claim 1, wherein the iterative Expectation Maximization algorithm is dependent on at least two random values, an element value and a value representing a relationship between proximate elements.

8. The data processing method according to claim 1, wherein the data vector represents an image, and wherein the data domain knowledge comprises morphological features of objects represented in the image.

9. The data processing method according to claim 1, wherein the data domain knowledge is employed to find an optimal separation variance equal to the minimized Bayes error of the putative classifications of the nodes.

10. The data processing method according to claim 1, wherein each node is committed or uncommitted to a putative classification, and wherein the iterative Expectation Maximization algorithm determines a classification of a committed node independent of a state of proximate nodes and a classification of an uncommitted node dependent on a state of proximate nodes.

11. A tangible computer readable medium storing instructions for controlling a programmable processor to perform the method according to claim 1.

12. A data processor system comprising:
  a memory adapted to store a data vector having an associated data domain knowledge;
  a processor, adapted to
    model the received data vector as a reliable lattice by mapping elements of the received data vector onto nodes in a corresponding reliable lattice, each node having a classification and a node classification reliability, and being linked to proximate nodes of the reliable lattice by respective links, each link having a lattice link reliability;
    iteratively improving the lattice reliability by using an Expectation Maximization algorithm to alter node classifications of the elements to generate an optimized reliable lattice; and
    perform verification of the optimized reliable lattice based on the domain knowledge, to reclassifying nodes of the optimized reliable lattice in dependence on the data domain knowledge and the received data vector; and
  an output, responsive to the optimized reliable lattice and verification.

13. The data system according to claim 12, wherein the data vector comprises an image comprising a plurality of pixels, wherein the received data vector is modeled as a reliable lattice by mapping pixels of the image onto nodes in a corresponding lattice.

14. The system according to claim 12, wherein each pixel has an associated color and luminance and a property to be classified, said property being unobserved in the image.

15. The system according to claim 14, wherein the processor performs the iterative Expectation Maximization algorithm to update a classification of a pixel is based on the associated respective color, luminance, and prior classification of the pixel, and respective color, luminance, and classification of proximate pixels within the image.

16. The system according to claim 12, wherein the iterative Expectation Maximization algorithm improves, for each iteration, a probability of correct classification of each element of the data matrix.

17. The system according to claim 12, wherein the iterative Expectation Maximization algorithm improves, for each iteration, a product of a lattice node reliability and a lattice link reliability.

18. The system according to claim 12, wherein the iterative Expectation Maximization algorithm is dependent on at least two random values, an element value and a value representing a relationship between proximate elements.

19. The system according to claim 12, wherein the data vector represents an image, and wherein the data domain knowledge comprises morphological features of objects represented in the image.

20. The system according to claim 12, wherein the data domain knowledge is employed by the processor to find an optimal separation variance equal to the minimized Bayes error of the putative classifications of the nodes.

21. The system according to claim 12, wherein each node is committed or uncommitted to a putative classification, and wherein the processor uses the iterative Expectation Maximization algorithm to determine a classification of a committed node independent of a state of proximate nodes and a classification of an uncommitted node dependent on a state of proximate nodes.

22. A method comprising the steps of:
  modeling a data vector as a reliable lattice by mapping elements of the data vector onto nodes in a corresponding reliable lattice, each node of the reliable lattice having an observed state, an unobserved state and at least one neighboring node;
  iteratively improving the lattice reliability by using an iterative Expectation Maximization algorithm executing on an automated data processor to alter node classifications of the elements with respect to the unobserved state, based on at least a prior iteration, if any; the observed state; and the relationship with respective neighboring nodes, wherein the observed state and a relationship with a respective neighboring nodes are treated as random variables, to generate an optimized reliable lattice, wherein during each iteration a probability of accurate classification of the nodes with respect to the unobserved state is increased;
  producing an output at least in dependence on the optimum reliable lattice.

23. The method according to claim 22, further comprising the steps of verifying the optimized reliable lattice based on a set of domain knowledge relating to the data vector, and reclassifying nodes in dependence on the domain knowledge.

24. The method according to claim 22, wherein the data vector comprises an image, and the unobserved state corresponds to a shadow state.

* * * * *

UNITED STATES PATENT AND TRADEMARK OFFICE
CERTIFICATE OF CORRECTION

| | | |
|---|---|---|
| PATENT NO. | : 7,826,640 B1 | Page 1 of 1 |
| APPLICATION NO. | : 12/111566 | |
| DATED | : November 2, 2010 | |
| INVENTOR(S) | : Jian Yao et al. | |

It is certified that error appears in the above-identified patent and that said Letters Patent is hereby corrected as shown below:

On the Title Page, Item (73) Assignee should read: The Research Foundation of State University of New York Signed and Sealed this Fourteenth Day of December, 2010

David J. Kappos
*Director of the United States Patent and Trademark Office*